US008377416B2

United States Patent
Varma et al.

(10) Patent No.: US 8,377,416 B2
(45) Date of Patent: Feb. 19, 2013

(54) METHOD FOR RELEASING HYDROGEN FROM AMMONIA BORANE

(75) Inventors: Arvind Varma, West Lafayette, IN (US); Moiz Diwan, West Lafayette, IN (US); Evgeny Shafirovich, El Paso, TX (US); Hyun-Tae Hwang, West Lafayette, IN (US); Ahmad Al-Kukhun, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 296 days.

(21) Appl. No.: 12/544,832

(22) Filed: Aug. 20, 2009

(65) Prior Publication Data

US 2010/0047159 A1 Feb. 25, 2010

Related U.S. Application Data

(60) Provisional application No. 61/090,425, filed on Aug. 20, 2008.

(51) Int. Cl.
*C01B 3/04* (2006.01)
*C01B 3/06* (2006.01)
(52) U.S. Cl. .................................................. 423/648.1
(58) Field of Classification Search .............. 423/648.1
See application file for complete search history.

(56) References Cited

U.S. PATENT DOCUMENTS

| 4,157,927 A * | 6/1979 | Chew et al. ............... 149/22 |
| 7,261,748 B2 * | 8/2007 | Jones et al. ................ 48/61 |
| 7,285,142 B1 * | 10/2007 | Mohajeri et al. ............ 48/61 |
| 7,316,788 B2 * | 1/2008 | Autrey et al. ......... 252/182.34 |
| 2007/0151153 A1 * | 7/2007 | Xu et al. ................. 48/197 R |
| 2010/0329974 A1 * | 12/2010 | Chen et al. ............... 423/648.1 |

OTHER PUBLICATIONS

Moiz Diwan et al, "Noncatalytic hydrothermolysis of ammonia borane", International Journal of Hydrogen Energy (2008), 33(4), 1135-1141.*
Fangyi Cheng et al, "Ni1-xPtx (x=0-0.12) Hollow Sheres as Catalysts for Hydrogen Generation from Ammonia Borane", Inorganic Chemistry (2007), 46 (3), 788-794.*

* cited by examiner

*Primary Examiner* — Wayne Langel
(74) *Attorney, Agent, or Firm* — Brinks Hofer Gilson & Lione

(57) ABSTRACT

A method of releasing hydrogen from ammonia borane is disclosed. The method comprises heating an aqueous ammonia borane solution to between about 80-135° C. at between about 14.7 and 200 pounds per square inch absolute (psia) to release hydrogen by hydrothermolysis.

3 Claims, 12 Drawing Sheets

METHOD FOR RELEASING HYDROGEN FROM AMMONIA BORANE

CROSS-REFERENCE TO RELATED APPLICATIONS

This application claims priority to U.S. Provisional Patent Application Ser. No. 61/090,425, filed Aug. 20, 2008, entitled "METHOD FOR RELEASING HYDROGEN FROM AMMONIA BORANE," the entire contents of which are incorporated herein by reference.

FEDERALLY SPONSORED RESEARCH AND DEVELOPMENT

This invention was made with government support under Contract No. DE-FG36-06GO86050 awarded by the Department of Energy. The government has certain rights in the invention.

FIELD OF THE INVENTION

The present invention relates to methods for releasing hydrogen from ammonia borane.

BACKGROUND OF THE INVENTION

The inherent higher specific energy (Wh/g) of fuel cells as compared with batteries, can serve the power demand of next generation vehicle applications. Hydrogen fuel cells can provide higher specific energy (Wh/g), power density (W/L) and double conversion efficiency as compared to batteries, provided that a practical, high density hydrogen storage method is available. Among various alternatives, chemical methods of hydrogen storage provide high specific energy at relatively simple storage conditions.

Ammonia borane ($NH_3BH_3$ or "AB") is a promising hydrogen storage material for fuel cell based vehicle applications and portable electronic devices as it contains 19.6 wt % hydrogen. Current methods of releasing hydrogen from AB include thermolysis and catalytic hydrolysis. Due to limited AB solubility in water, catalytic hydrolysis provides low theoretical H2 yield (~5.6 wt %) and it also requires expensive catalysts such as ruthenium. Thermolysis, on the other hand, requires an external heating source to provide relatively high temperature (~170° C.) to release two moles of hydrogen per mol of AB, while the third H2 mole requires even higher temperature (~500° C.).

Thus, the current methods of releasing hydrogen from AB include relatively high temperatures required, environmental issues, catalyst requirements, high costs, and fluidic management. Accordingly, there is a need for a more efficient method of releasing hydrogen from AB.

BRIEF SUMMARY OF THE INVENTION

The present invention generally provides examples of generating hydrogen with sufficient hydrogen yield applicable for any suitable system including portable systems in a cost effective matter. Examples of the present invention generate hydrogen in an efficient way that allows for hydrogen storage without requiring catalysts, toxicity, or poisonous or harmful components. Moreover, examples of the present invention provide a method of releasing hydrogen from ammonia borane ("AB" or $NH_3BH_3$). Examples of the present invention provide the integration of thermolysis and hydrolysis, or hydrothermolysis, to release more hydrogen from AB than thermolysis alone, at moderate temperatures and pressures.

In one example, the present invention provides a method of releasing hydrogen from AB. The method comprises heating an aqueous ammonia borane solution to between about 80-135° C. at between about 14.7 and 200 pounds per square inch absolute (psia) to release hydrogen by hydrothermolysis.

In another example, the present invention provides a method of releasing hydrogen from ammonia borane. The method comprises releasing hydrogen, by thermolysis, from aqueous ammonia borane solution at between about 80-135° C. at between about 14.7 and 200 pounds per square inch absolute (psia). The method further comprises releasing hydrogen, by noncatalytic hydrolysis, from ammonia borane and water of the aqueous ammonia borane solution.

Further objects, features, and advantages of the present invention will become apparent from consideration of the following description and the appended claims when taken in connection with the accompanying drawings.

DETAILED DESCRIPTION OF THE INVENTION

Figure 1:
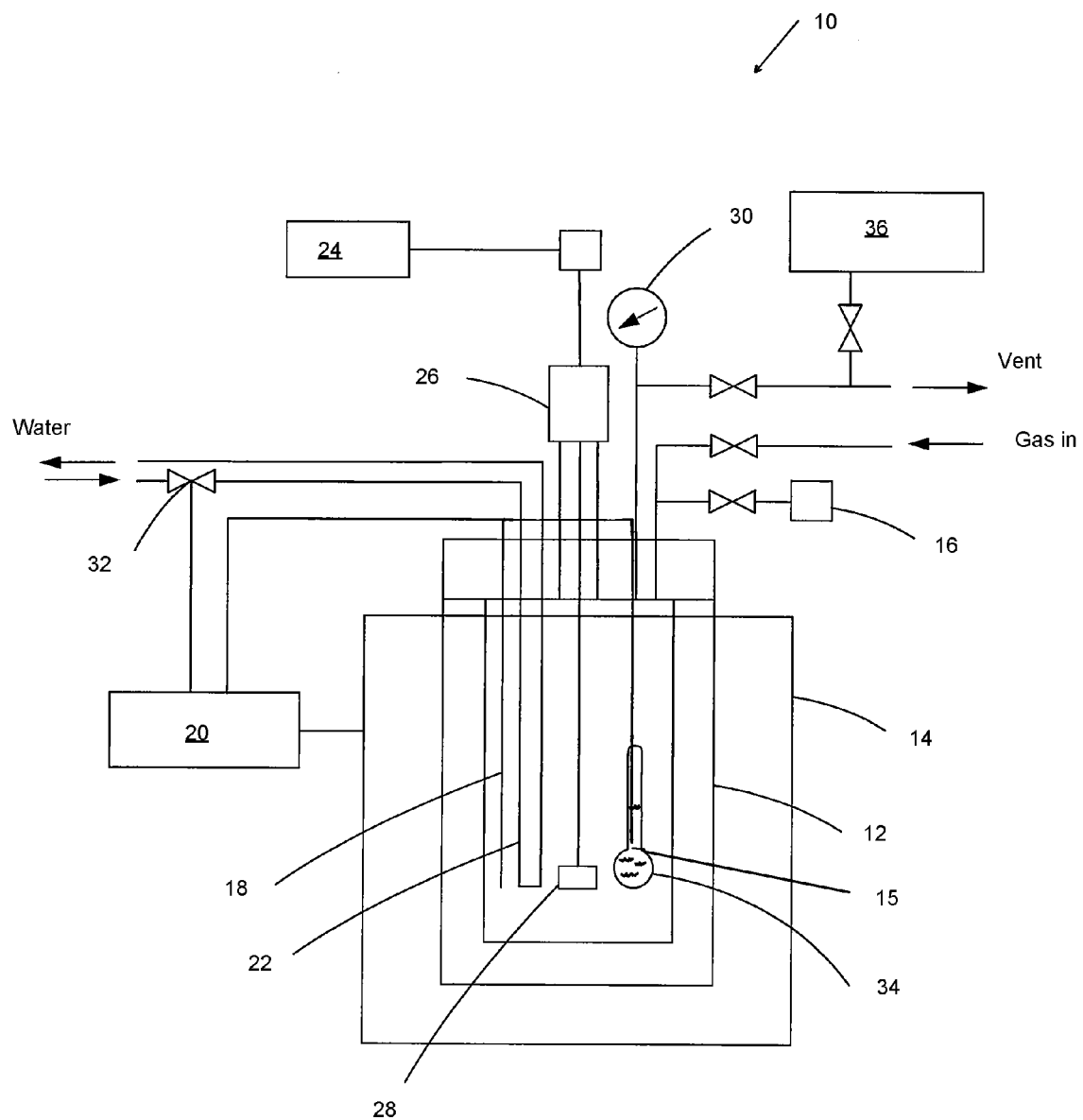
FIG. 1 is a schematic diagram of an apparatus for a method of releasing hydrogen from AB in accordance with examples of the present invention.

Examples of the present invention generate hydrogen in an efficient manner without including any catalysts or toxic components. In one example, the method comprises using noncatalytic hydrothermolysis, i.e., integrated thermolysis and hydrolysis, to release more hydrogen from AB than thermolysis alone, at moderate temperatures and pressures. As provided above, AB is a compound that contains about 19.6 wt % hydrogen and thus is a promising hydrogen storage material for fuel cells. As challenges to release hydrogen from AB have been experienced, examples of the present invention use both thermolysis and hydrolysis. Applicants' previous studies involving the integration of thermolysis and hydrolysis to generate hydrogen from AB are described in the 61/090,425 Application as well as U.S. Provisional Patent Application Ser. No. 60/957,111, filed Aug. 21, 2007, entitled "METHOD FOR RELEASING HYDROGEN FROM AMMONIA BORANE," the entire contents of which are incorporated herein by reference. Hydrolysis may be described by:

$$NH_3BH_3 + 4H_2O \rightarrow NH_4OH + H_3BO_3 + 3H_2.$$

In one example, the present invention demonstrates a novel noncatalytic AB hydrothermolysis based method where heating solutions of lean AB (~10 wt %) in $D_2O$ at ~135° C. under moderate argon pressure (~10 atm) generates 1 equivalent of $H_2$ (thermolysis) and 2 equivalent of HD (hydrolysis). In further examples of the present invention, the noncatalytic AB hydrothermolysis based method is extended to higher AB concentrations, which can provide higher hydrogen yield values. These methods have been experimentally conducted without the use of any catalyst.

The solubility of AB in water at room temperature (22° C.) is about 26 wt %, which means that for catalytic hydrolysis, maximum 26 wt % AB could be dissolved without phase separation. The noncatalytic hydrothermolysis, however, does not require the AB/water mixture to be in a solution form, allowing the use of AB concentrations above its solubility limit (i.e. AB/water slurries). Thus, the term "aqueous ammonia borane solution" as used herein includes AB/water mixtures, both in solution form and AB/water slurries. The use of higher temperature is further expected to increase the AB solubility. For these reasons, AB solubility in water was studied over a wide temperature range.

In the present invention, the hydrothermolysis approach is demonstrated to generate hydrogen over a wide range of AB concentrations, pressure, and temperature. To differentiate between thermolysis and hydrolysis, $D_2O$ was used instead of $H_2O$ (isotopic tests). The experiments were conducted replacing water by $D_2O$ (99.8% D, Sigma Aldrich). The isotopic tests provide the ability to differentiate between the sources of the released hydrogen: $H_2$ from AB thermolysis and HD from AB hydrolysis:

Thermolysis $NH_3BH_3 \rightarrow \frac{1}{x}(NH_2BH_2)_x + H_2$ or $NH_3BH_3 \rightarrow \frac{1}{x}(NHBH)_x + 2H_2$ Hydrolysis $NH_3BH_3 + 4D_2O \rightarrow NH_3DB(OD)_4 + 3HD$ In one example, the hydrothermolysis experiments were conducted at reactor temperature ($T_{reactor}$) below PEM fuel cell temperatures (~85° C.) and the results verified the hypothesis that hydrogen could be released from rich-AB/water mixtures at temperatures lower than that required for pure AB thermolysis since the release of hydrogen from AB via both thermolysis (1 equivalent of $H_2$) and hydrolysis is exothermic. The present experiments also study the effect of AB concentration and pressure on hydrogen ($H_2$+HD) yield, transient pressure and temperature measurements to understand the heat effects during hydrogen release, condensed product characterization using $^{11}$B NMR spectroscopy, and gaseous product characterization using mass spectrometry.

EXAMPLE

This example provides a method of releasing hydrogen. In this example, experiments on releasing hydrogen from aqueous ammonia borane solution through hydrothermolysis were conducted. FIG. 1 illustrates a hydrothermolysis system 10 including a 3-L stainless steel chamber or reactor 12 (Parr Instrument Company, Model 4561) equipped with an external heater 14, a pressure transducer 16, a thermocouple 18 and temperature controller 20, and a water-flow cooling loop 22 for temperature stabilization. The system further includes a motor 24, a magnetic drive 26, an impeller 28, a pressure gauge 30, and solenoid valves 32.

In this example, the samples 15, or aqueous ammonia borane solutions, (0.5-1 g) were prepared by mixing AB (97% pure, Sigma Aldrich) with D2O (99.8% D, Sigma Aldrich) in varying weight ratios. Note that while $D_2O$ was used in the experiments, the weight of the equivalent $H_2O$ was applied to report the AB concentration in the mixture. The mixture was placed in a small glass vial 34 (3 ml) inside the reactor 12, under argon (99.99% pure) environment (15-200 psia). The top of the vial 34 was covered with a porous quartz frit (pore size ~100 microns) to minimize water loss by vaporization. Starting at room temperature, with heating rate programmed at 7° C./min, the reaction vessel was maintained for 15-minute hold at a specific temperature in the range 80-135° C. ($T_{reactor}$; Omega Engineering, type J thermocouple) with continuous gas stirring. The reactor pressure was monitored using the pressure transducer 16 (Omega Engineering PX35D1-1000AV). Apart from the reactor temperature, the sample temperature ($T_{sample}$) was also recorded by inserting the thermocouple 18 (Omega Engineering, type J) inside the sample. To measure AB solubility, the glass vial 34 with known amount of water was used. It was submerged in a water bath for temperature control and AB was added gradually until its precipitation was observed.

The product gas composition was analyzed by a mass-spectrometer 36 (Hiden Analytical HPR-20) after cooling the reactor to room temperature at the end of the experiment. Deuterium hydride (HD, 99.8% pure, Sigma Aldrich), 10% $H_2$/90% Ar gas mixture (Mittler) and mixture of $H_2$ (99.999% pure, Matheson Tri Gas) and Ar (99.997% pure, Matheson Tri Gas) were used for mass-spectrometer calibration. The hydrogen generation was calculated using the gas composition analysis, along with pressure increase during the experiment. Each data point for AB concentration ≦88 wt % presented in the subsequent figures is an average of 2-4 experiments, with ±3% error. The results for AB>88 wt % are not presented due to poor reproducibility, caused by nonuniform mixing of AB in limited $D_2O$. For comparison, pure AB thermolysis was also conducted in the same experimental setup.

The condensed product was analyzed using liquid-state $^{11}B$ NMR. The NMR samples were made by dissolving the solid AB hydrothermolysis products (0.1 wt % concentration) in dimethyl sulphoxide (Mallinckrodt Chemicals). The $^{11}B$ NMR spectra were recorded using a Varian Inova-300 spectrometer (96.25 MHz) equipped with a tunable 4-nucleus probe and were referenced to $BF_3.OEt_2$ (0.0 ppm) as an external standard. The samples were run unlocked and without spinning, at room temperature (ca. 20° C.), while the spectra were obtained without $^1H$ decoupling.

Figure 2:
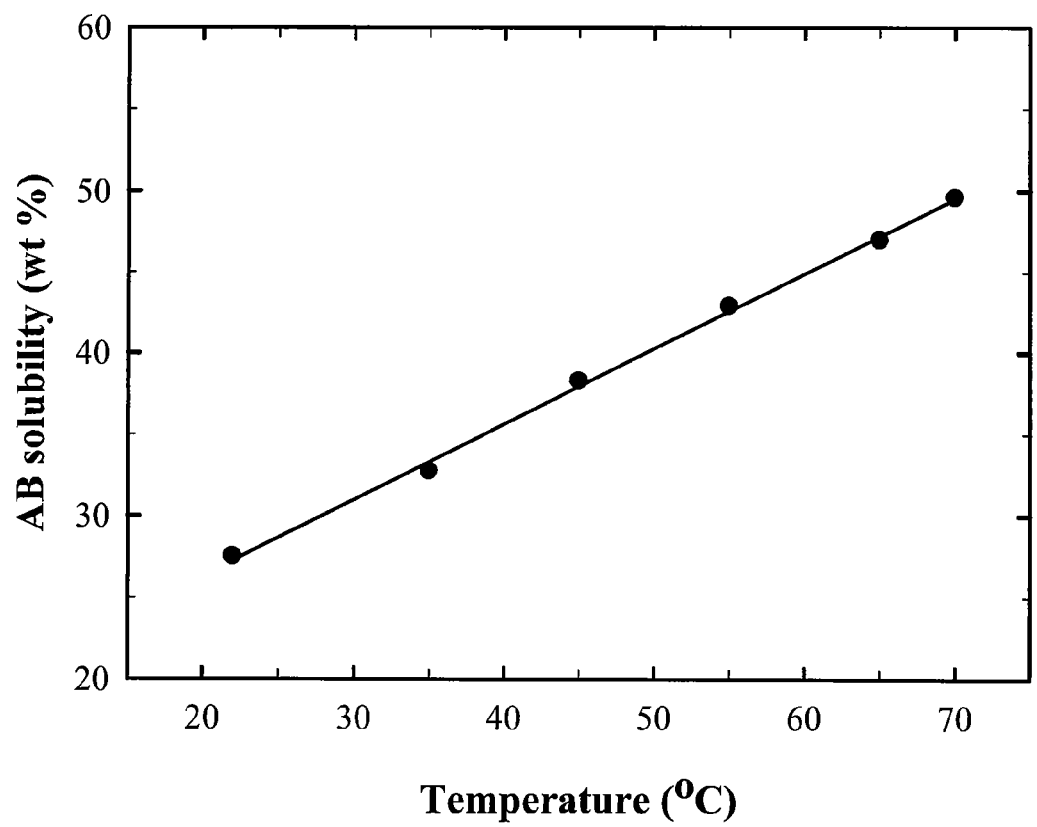
FIG. 2 is a graph depicting AB solubility as a function of temperature.

Referring to FIG. 2, the AB solubility in water from 22° C. (room temperature) to 70° C. was investigated. For T>70° C., hydrogen bubble formation from the aq. AB solution was observed, indicating initiation of the AB/H2O reaction. At room temperature (22° C.), the AB solubility was found to be 27.5 wt %; it increased linearly with temperature and was ~50 wt % at 70° C. This study helped to determine the maximum amount of AB that could be dissolved in water, and the temperature to store AB in solution form without hydrogen evolution.

Figure 3:
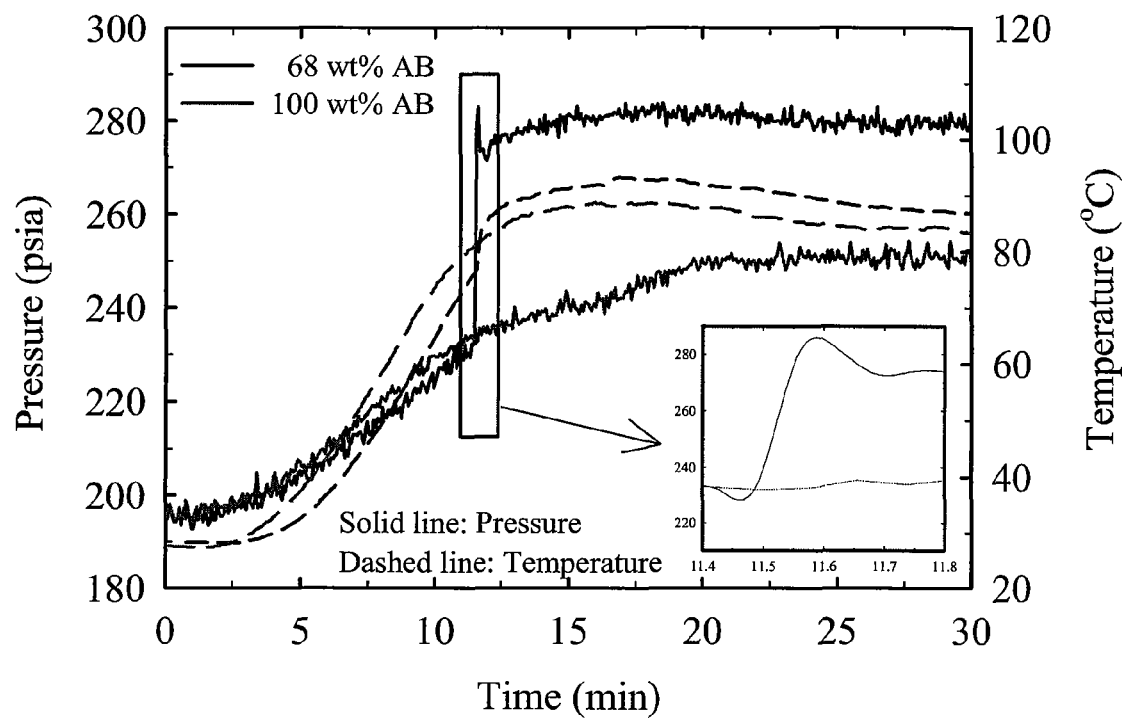
FIG. 3 is a graph depicting reactor pressure and temperature profiles obtained during AB hydrothermolysis (68% AB in $D_2O$) and AB thermolysis.

To investigate the effect on hydrogen yield via noncatalytic hydrothermolysis process, experiments were initially conducted for AB<43 wt % at $T_{reactor}$~135° C. and P~200 psia. Further, experiments with higher concentrations of AB in water, above the solubility limit, were also conducted. FIG. 3 shows the typical reactor pressure and temperature profiles for AB hydrothermolysis and AB thermolysis. The increase in pressure is due to heating the argon gas and hydrogen generation. The pressure profile for hydrothermolysis experiment is shown for 68 wt % AB in $D_2O$. It was found that for AB concentration ≧43 wt %, the pressure increased sharply at $T_{reactor}$ in the range 75-85° C. (depending on AB concentration). This pressure rise was not observed for AB thermolysis.

Figure 4:
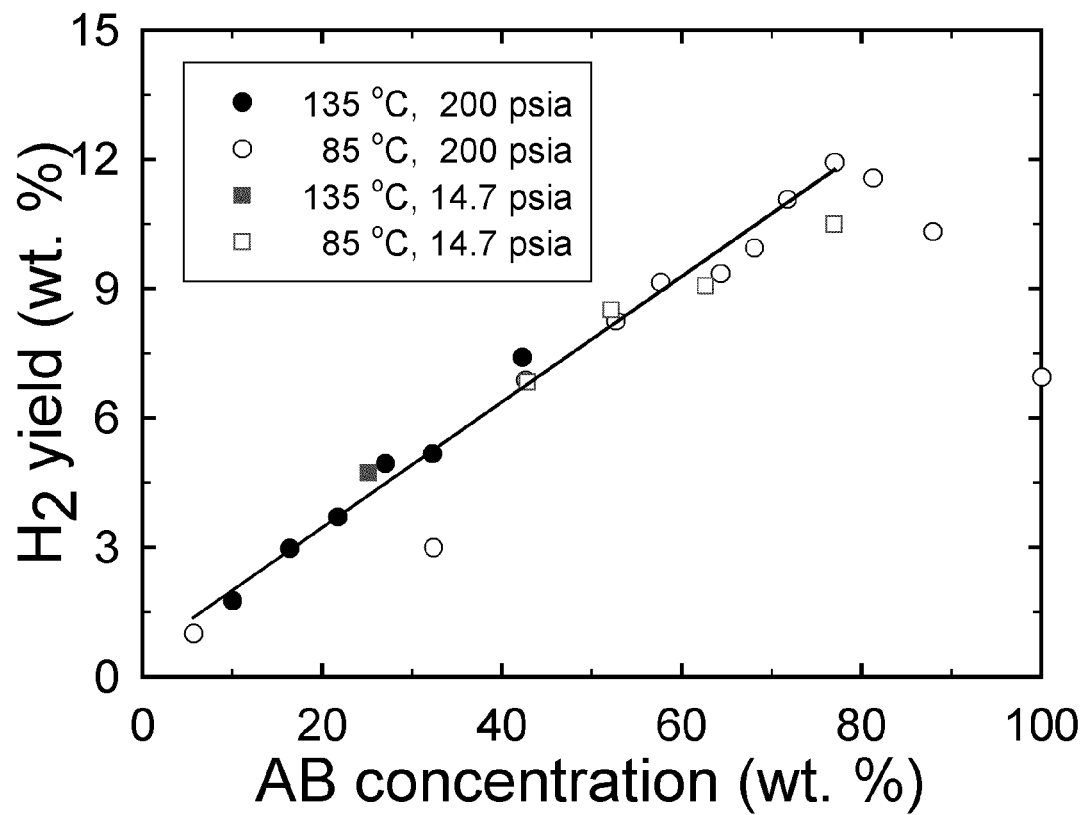
FIG. 4 is a graph depicting hydrogen yield as a function of AB concentration at different operating conditions.

As shown in FIG. 3, the detailed pressure rise for AB hydrothermolysis shows that within a few seconds all the gases were generated and further pressure increase was due to the combined effect of reaction exothermicity and reactor temperature rise to the set point value. These results suggest that all the gas generation occurred at $T_{reactor}$~80° C. and for AB concentration ≧43 wt %, $T_{reactor}$~85° C. was sufficient to release the same amount of hydrogen as at 135° C. (FIG. 4). For this reason, all experiments for AB≧43 wt % were conducted at $T_{reactor}$~85° C. The sharp pressure rise, however, was not seen for AB≧32 wt %, where $T_{reactor}$~135° C. was required to release the gas.

Figure 5:
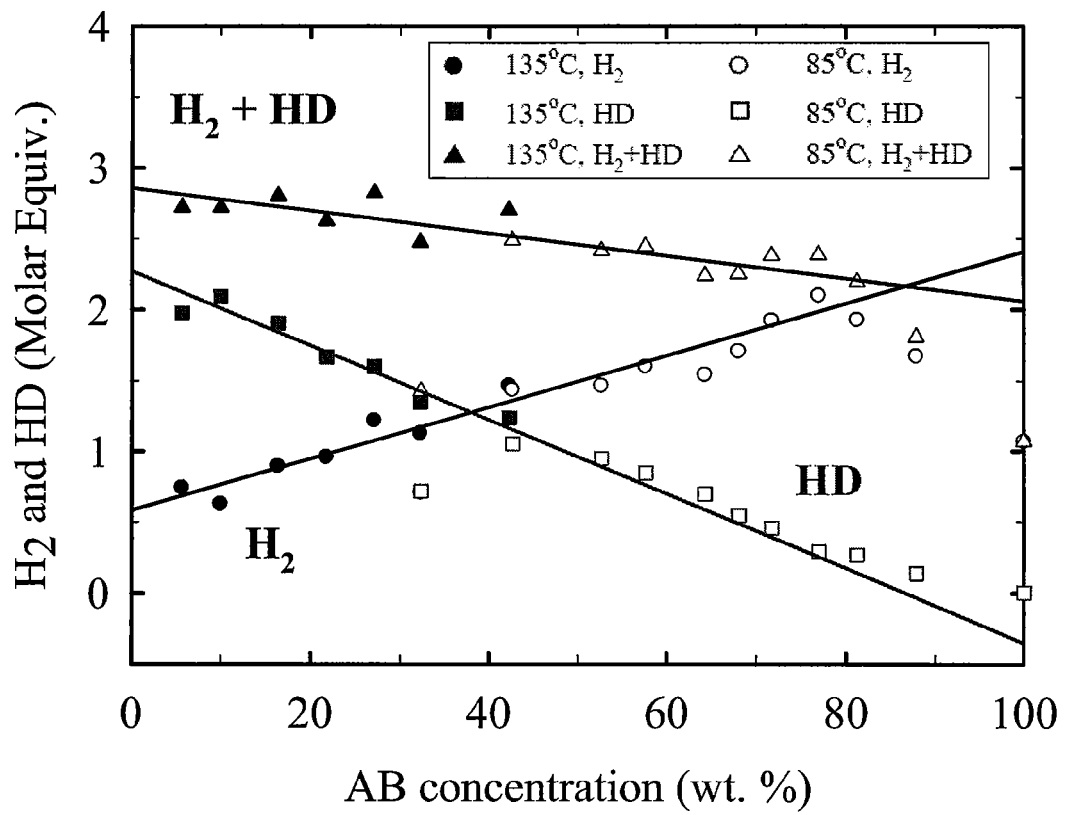
FIG. 5 is a graph depicting the $H_2$ and HD molar equivalents as a function of AB concentration, wherein P=200 psia.

As noted above, in experiments where $D_2O$ is used instead of $H_2O$, $H_2$ results from AB thermolysis while HD from its hydrolysis. The $H_2$ and HD equivalents were calculated by taking the molar ratio of the specific gas and AB. As the AB concentration increased from 6 to 77 wt %, the $H_2$ molar equivalent increased from 0.75 to 2.1, while HD molar equivalent decreased from 2 to 0.3 (FIG. 5). However, the total hydrogen molar equivalent ($H_2$+HD) remained in the relatively narrow range of 2.5-2.75. Thus, the role of thermolysis, as compared to hydrolysis, increases with AB concentration. For further increase in AB concentration from 77-88 wt %, the $H_2$ equivalent decreased from 2.1 to 1.75, while HD equivalent remained ~0.3. The total hydrogen molar equivalent ($H_2$+HD) also decreased from 2.75 to 2.25.

Referring to FIG. 4, the overall hydrogen yield as a function of AB concentration is shown and calculated as:

$$\text{Yield}(wt\ \%) = \frac{wt\ \text{of}\ (H_2 + HD)}{wt\ \text{of}\ (AB + D_2O)} \times 100$$

where wt(HD) and wt($D_2O$) are the weights of $H_2$ and $H_2O$, respectively, corresponding to the measured HD and $D_2O$ values, with D replaced by H. The hydrogen yield increased with AB concentration. At 85° C., from 43 to 77 wt % AB, hydrogen yields increased from 7 to 11.9 wt %. Further increase in AB concentration decreased the hydrogen yield, similar to the total hydrogen molar equivalent. The reason for this decrease could be related to the lower exothermicity of hydrolysis reaction to drive the AB thermolysis. The $H_2$ yield for pure AB thermolysis conducted at 200 psia and $T_{reactor}$~85° C. was only 7 wt % (1.07$H_2$ molar equivalent), consistent with previous findings. Due to the exothermic release of the first mole of hydrogen, the maximum Tsample for thermolysis was found to be 105° C.

Figure 6:
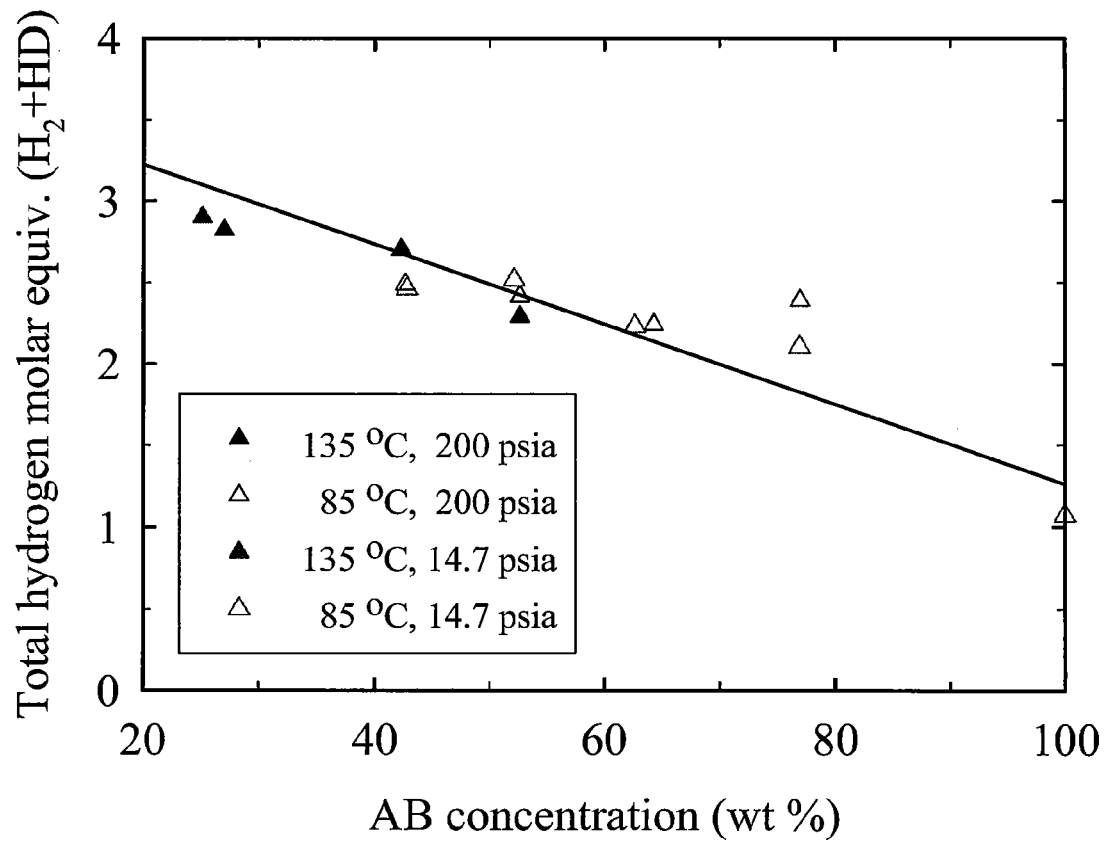
FIG. 6 is a graph depicting the effect of Ar pressure on the total hydrogen molar equivalent for varying AB concentrations.

FIG. 4 also shows the effect of initial argon pressure on hydrogen yield, where experiments were conducted at 14.7 and 200 psia. For AB concentration <77 wt %, the results show no significant effect of pressure on hydrogen yield (see FIG. 6) as also demonstrated for pure thermolysis at 600 bar by Baitalow et al. 20 Particularly for lower AB concentrations, however, the sample product was found to be dry for 14.7 psia, while it was in solution form at 200 psia initial pressure. This is likely due to evaporation of water from the sample during the long cooling period following reaction. For 77 wt % AB, the hydrogen yield (FIG. 4) and total hydrogen molar equivalent (FIG. 6) for 14.7 psia were lower (10.5 wt %, 2.1 molar eq.) as compared to 200 psia (11.9 wt %, 2.4 molar eq.). Since the water content in high AB concentration mixtures is small, its evaporation has a strong impact and raises the effective mixture AB concentration beyond 77 wt %. In this range, as discussed above, the hydrogen yield decreases with increasing AB concentration.

Figure 7A:
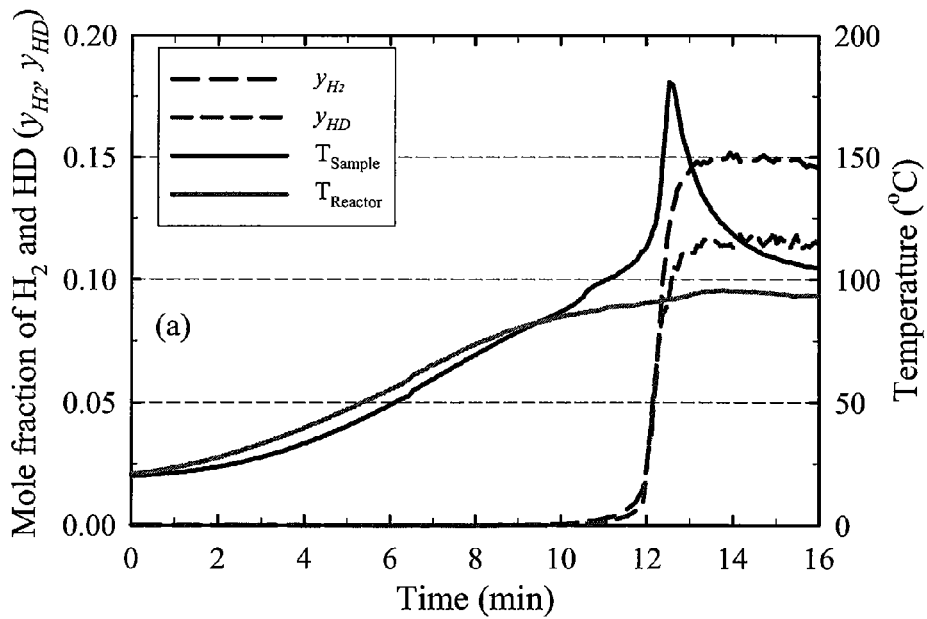
FIG. 7a is a graph depicting transient analysis during hydrothermolysis process for 43 wt % AB in $D_2O$, wherein $T_{reactor}$=85° C. and P=200 psia.
Figure 7B:
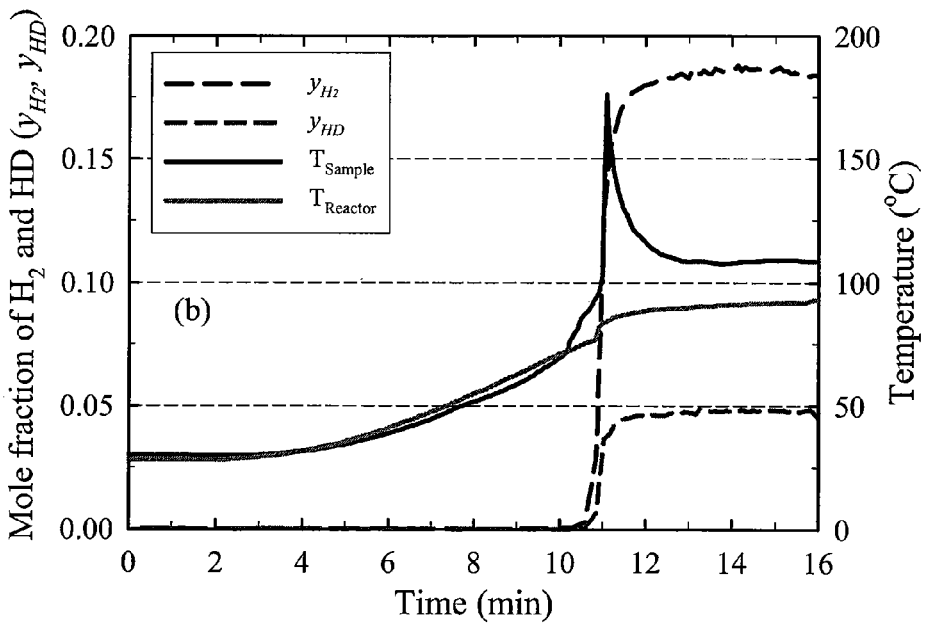
FIG. 7b is a graph depicting transient analysis during hydrothermolysis process for 68 wt % AB in $D_2O$, wherein $T_{reactor}$=85° C. and P=200 psia.

FIGS. 7a and 7b show transient mass-spectrometry analysis for 43 wt % and 68 wt % AB concentration, respectively, at $T_{reactor}$~85° C., where Ar continuously flowed through the Parr reactor at 200 psia and gas composition was measured with time. It was found that at $T_{reactor}$~80° C., $T_{sample}$ increased sharply up to ~180° C. (sufficient to release the second $H_2$ mole from AB), with simultaneous evolution of $H_2$ and HD. The sample temperature increased sharply due to heat evolution during hydrothermolysis reaction (as noted above, both AB hydrolysis and the first step of AB thermolysis are exothermic). The $H_2$ and HD evolution began at the same time at $T_{sample}$~105° C. and reached maximum value within a few seconds, which suggests rapid reaction kinetics. For 43 wt % AB, the maximum $H_2$ and HD mole fractions were close, whereas for 68 wt %, HD value was lower than $H_2$ owing to decreased hydrolysis as compared to thermolysis (see FIG. 5).

Figure 8:
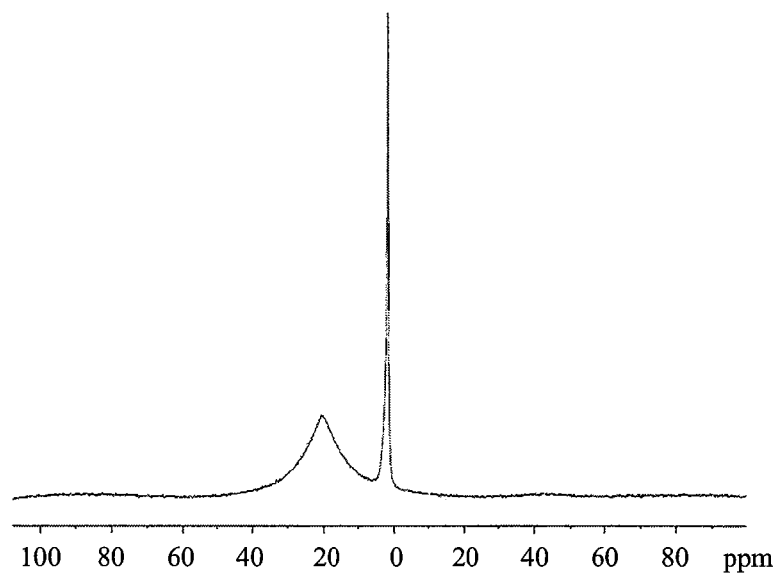
FIG. 8 is a graph depicting $^{11}B$ NMR spectrum of the AB hydrothermolysis product, wherein the hydrothermolysis experiment was conducted using 53 wt % AB in $D_2O$, wherein $T_{reactor}$=85° C. and P=200 psia.

FIG. 8 depicts a $^{11}B$ NMR spectrum of the obtained hydrothermolysis products. There is no peak at −23.8 ppm corresponding to AB which indicates that the reaction was complete. The peak near 0 ppm is likely corresponding to B(IV) coordinated atoms. The peak at 20.4 ppm shows the formation of B(III) coordinated atoms which could be attributed to either boric acid, $B(OH)_3$, product of catalytic AB hydrolysis or polyiminoborane.

The noncatalytic AB hydrothermolysis method to release hydrogen was studied over a wide range of AB concentrations, pressures and temperatures. In these experiments, instead of $H_2O$, $D_2O$ was used to clarify the reaction mechanism. It was shown that with increasing AB concentration (6-77 wt %), the $H_2$ molar equivalent increased, while the HD molar equivalent decreased. Thus the role of thermolysis ($H_2$ yield), as compared to hydrolysis (HD yield), increases with AB concentration. The effect of pressure on hydrogen yield was found to be insignificant in the range <77 wt % AB. The hydrogen storage capacity up to 10.5 and 11.9 wt %, along with rapid kinetics, at $T_{reactor}$~85° C. and at pressure 14.7 and 200 psia, respectively was demonstrated. Transient experiments showed that during the hydrothermolysis process, the sample temperature increased sharply due to heat evolution by reaction (both AB hydrolysis and the first step of AB thermolysis are exothermic). The $H_2$ and HD evolution began simultaneously at $T_{sample}$~105° C., and reached maximum value within a few seconds which suggests rapid reaction kinetics.

The disclosed AB hydrothermolysis process is the first one to provide such high hydrogen yield values at below PEM fuel cell operating temperatures. Further, for the same temperature range, these yield values are higher than previously reported in the literature by either AB hydrolysis or thermolysis alone. It is worth noting that DOE system targets for $H_2$ yield are 4.5 and 5.5 wt % for the years 2010 and 2015, respectively. The material-based $H_2$ yield (~11.9 wt %) achieved in this work is sufficiently higher than the target values, suggesting that the noncatalytic AB hydrothermolysis method is promising for hydrogen storage in fuel cell based vehicle applications

EXAMPLE

In earlier examples disclosed in the 61/090,425 Application, experiments of releasing hydrogen from aqueous ammonia borane solution through hydrothermolysis were conducted using the hydrothermolysis system 10 of FIG. 1. In this example, experiments were conducted on heating aqueous AB solutions (9.1 wt % AB) to temperature 117-135° C., at which thermolysis of dry AB would release approximately one mole of hydrogen from 1 mole of AB. These experiments were conducted without the use of any catalyst. To prevent water boiling, experiments were conducted under high pressure of argon (from 150 to 250 psig) in a closed reactor. Pressures ranging between 150 and 250 pounds per square inch gauge (psig) allow aqueous AB solution to be heated to a temperature of about 135° C. without water boiling, and conduct hydrolysis without catalyst. The amount of released hydrogen was measured using mass-spectrometry.

In one example, it was found that, at temperature 117-135° C. and pressure 150 to 250 psig, for 1 mole of AB, 1.0-1.2 mole of $H_2$ is generated by AB thermolysis and 1.8-2.0 moles of HD are generated by AB hydrolysis (reaction of AB with $D_2O$), with the total amount of hydrogen ($H_2$+HD) being equal to ~3 moles. This means that hydrolysis releases additional hydrogen from AB (0.75-1.0 of the amount released by thermolysis) and also the same hydrogen amount from water.

Thus, heating of aqueous AB solution to 117-135° C. at pressures 150 to 250 psig allows, effectively using both thermolysis and hydrolysis, the release of additional hydrogen from AB (which cannot be released at this temperature by using thermolysis alone) and water, resulting in higher hydrogen yield than for thermolysis alone at this temperature. Further, this release does not require the use of any catalyst.

Examples of the present invention allow, without use of catalyst, the release of more hydrogen from AB at temperature 117-135° C. as compared with pure thermolysis. The moderate pressure can be created in power sources. The method does not involve, besides AB, any expensive materials such as catalysts, ionic liquids and mesoporous silica scaffolds.

Figure 9:
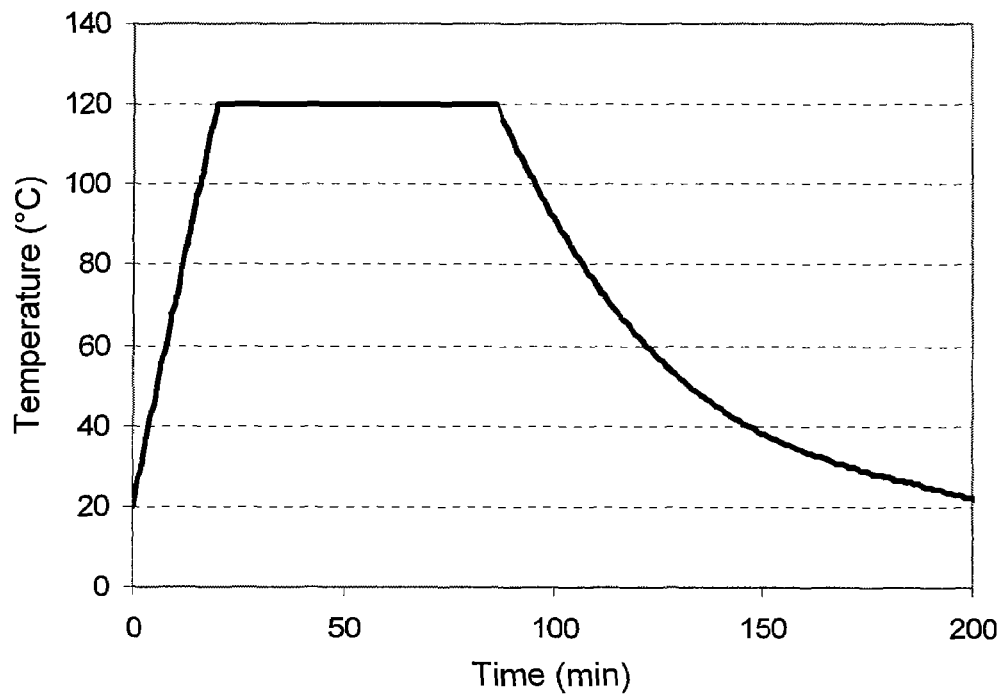
FIG. 9 is a graph depicting the reactor temperature profile during an experiment in accordance with another example of the present invention.

In one example, the samples 15, or aqueous ammonia solutions were prepared by mixing AB with $D_2O$ (99.8% D, Sigma Aldrich) and the obtained AB:$D_2O$ solution (mass ratio 1:10) was placed in a glass vial 34 with a small liquid-gas interfacial area (to decrease evaporation). The vial 34 was placed in the reactor 12, which was then purged and filled with argon (99.99% pure) to create the initial pressure 11.2, 14.6 or 18.0 atm. As shown in FIG. 9, illustrating the typical reactor temperature profile during the experiment, the heating cycle included the temperature ramp at 1, 5 or 10° C./min, 1-hr stay at the maximum temperature (100-170° C.), and cooling. The reactor pressure was monitored using the transducer 16 (Omega Engineering PX35D1-1000AV) and for the initial pressures noted above increased up to 18, 23 and 28 atm, respectively, at temperature 170° C. The gas composition was analyzed by the mass spectrometer 36 (Hiden Analytical HPR-20) after cooling the reactor 12 to room temperature. Deuterium hydride (HD, 99.8% pure, Sigma Aldrich) and 10% $H_2$/90% Ar gas mixture (Mittler) were used for mass-spectrometer calibration. The $^{11}B$ NMR spectra were recorded using a Varian Gemini-300 spectrometer (64 MHz) with a Nalorac quad probe and were referenced to $BF_3.OEt_2$ (0.0 ppm) as an external standard.

In another example, the reaction is conducted at 117° C. under argon pressure of 200 psig. This results in releasing 1.2 molar equivalent of hydrogen via AB thermolysis and additional 1.8 molar equivalents of hydrogen via reaction of AB with water. The experiments are conducted using the 3-L stainless steel Parr reactor 12 of FIG. 1. The sample 15 is prepared by mixing AB with water in 1:10 weight ratio. The mixture is placed in a small vessel 34 inside the reactor 12, under Ar pressure. With heating rate programmed at 5° C./min, the reaction vessel is maintained for 1 hr at the specified temperature with continuous gas stirring. The gas composition is analyzed by mass-spectrometry (Hiden Analytical HPR-20) after cooling the reaction vessel.

In another example, the reaction is conducted at 135° C. under argon pressure of 200 psig. This results in releasing 1.0 molar equivalent of hydrogen via AB thermolysis and additional 2.0 molar equivalents of hydrogen via reaction of AB with water.

In yet another example, the reaction is conducted at 135° C. under argon pressure of 150 psig. This results in releasing 1.0 molar equivalent of hydrogen via AB thermolysis and additional 1.8 molar equivalents of hydrogen via reaction of AB with water.

In yet another example, the reaction is conducted at 135° C. under argon pressure of 250 psig. This results in releasing 1.2 molar equivalent of hydrogen via AB thermolysis and additional 1.8 molar equivalents of hydrogen via reaction of AB with water.

Figure 10:
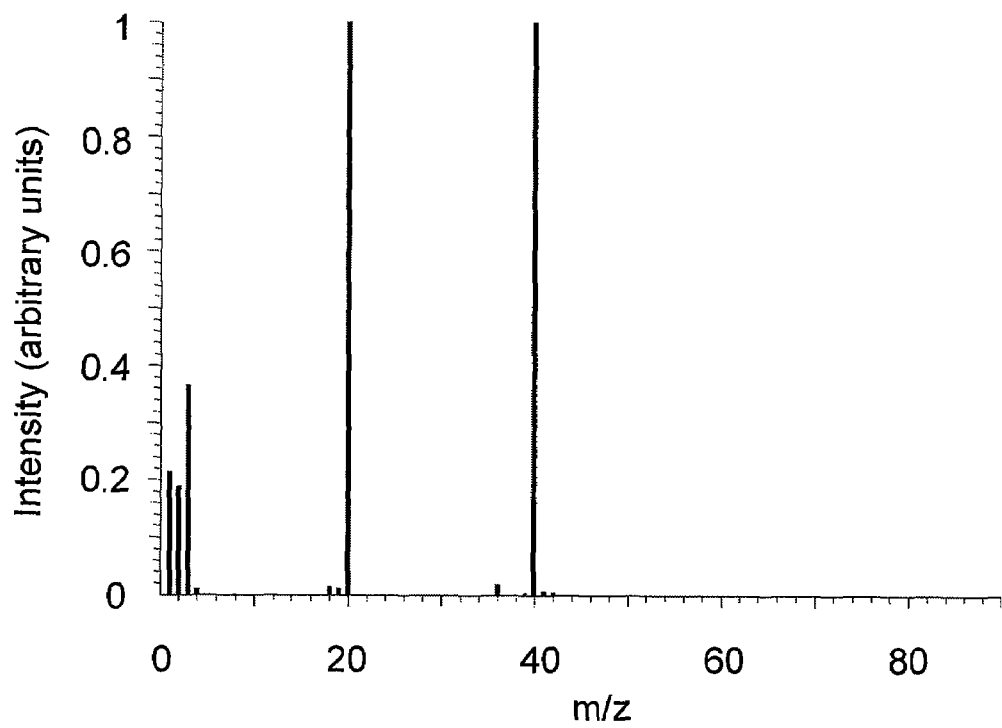
FIG. 10 is a graph depicting the mass spectrum of reactor atmosphere, wherein initial pressure is 14.6 atm and the maximum temperature is 135° C.

In these examples, reactions in AB/$D_2O$ solutions were studied over the temperature range 100-170° C. under Ar pressure (initial) 11.2-18 atm. Mass spectral analysis of the reactor atmosphere after all experiments showed $H_2$ and HD as the main gaseous products. FIG. 10 depicts a typical mass spectrum of the reactor gas where the peaks at m1, m2 and m3 indicate $H^+$, $H_2^+$ and $HD^+$, respectively, while the peaks at m20, m36 and m40 are assigned to $^{40}Ar^{2+}$, $^{36}Ar^+$ and $^{40}Ar^+$, respectively. There are no peaks referred to borazine $(BHNH)_3$, monomeric aminoborane $BH_2NH_2$ and diborane $B_2H_6$, which were present in the mass spectra of gaseous products formed during the thermal decomposition of AB in the temperature range up to 200° C. Using calibration, the amounts of evolved $H_2$ and HD were determined from the MS measurements. The total ($H_2$+HD) yield is in a good agreement with the value obtained from pressure measurements.

Figure 11:
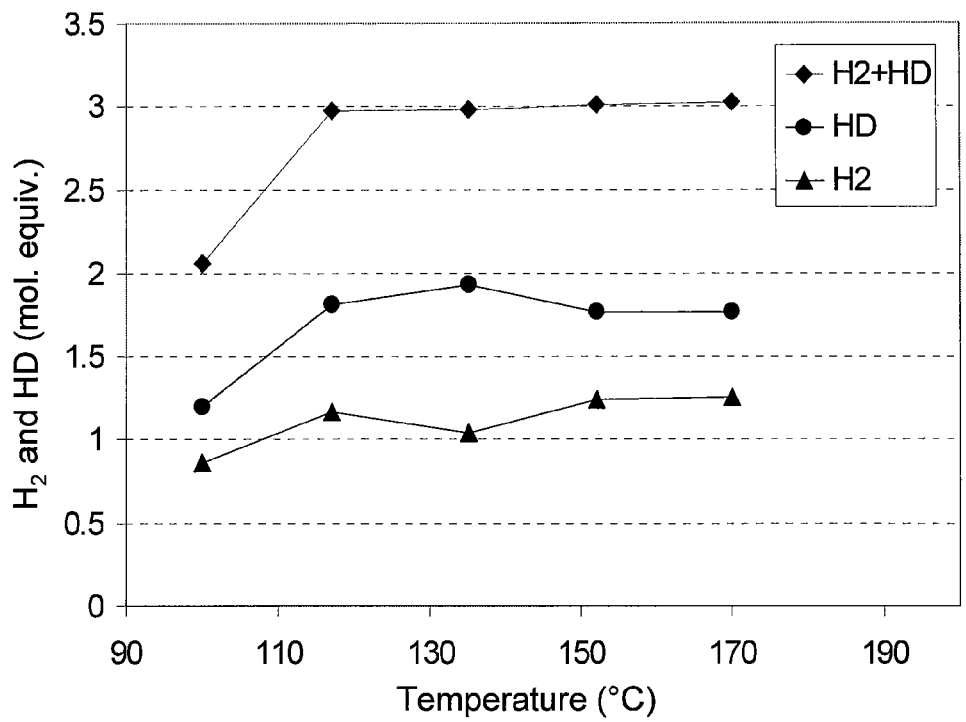
FIG. 11 is a graph depicting amounts of $H_2$ and HD evolved from $AB/D_2O$ mixtures at initial pressure of 14.6 atm, heating rate 5° C./min and plateau duration of 1 hr. as a function of maximum temperature.

FIG. 11 shows the produced amounts of $H_2$ and HD over the temperature range 100-170° C. at initial pressure 14.6 atm, heating rate 5° C./min and plateau time 1 hr. It is shown that the HD yield is higher as compared to $H_2$. Both values are approximately constant over the temperature range 117-170° C. Note that the constancy is even more striking for the sum of $H_2$ and HD, i.e., some redistribution between $H_2$ and HD occurs but the total amount of released hydrogen remains the same (3 equiv.).

Figure 12:
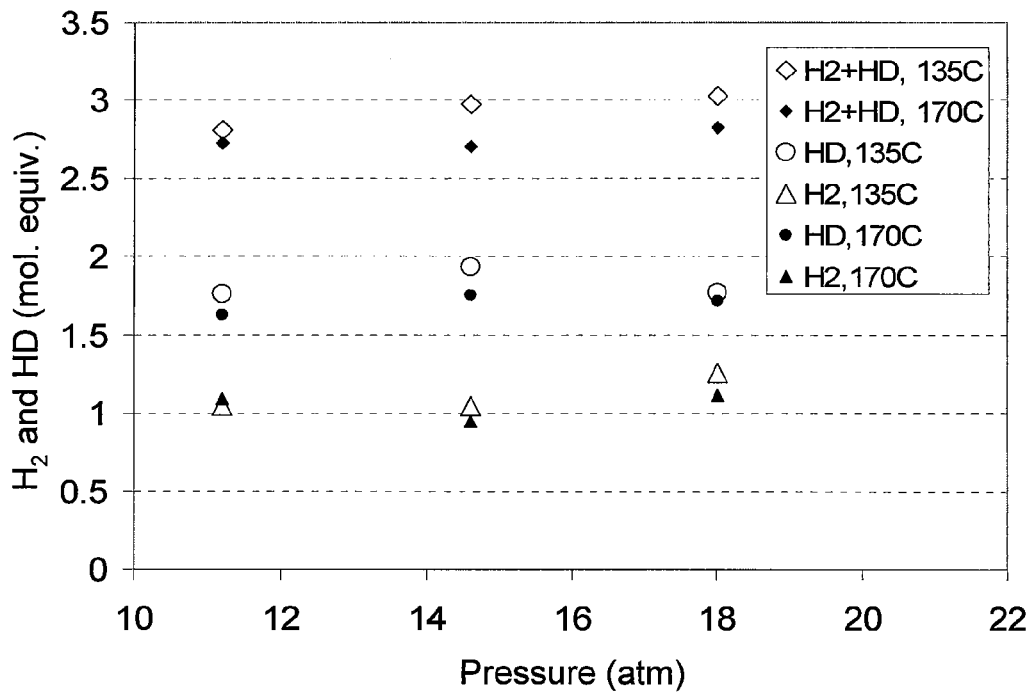
FIG. 12 is a graph depicting the influence of initial pressure on the amounts of $H_2$ and HD evolved from $AB/D_2O$ mixtures at maximum temperatures 135° C. and 170° C., heating rate 5° C./min and plateau duration of 1 hr.
Figure 13:
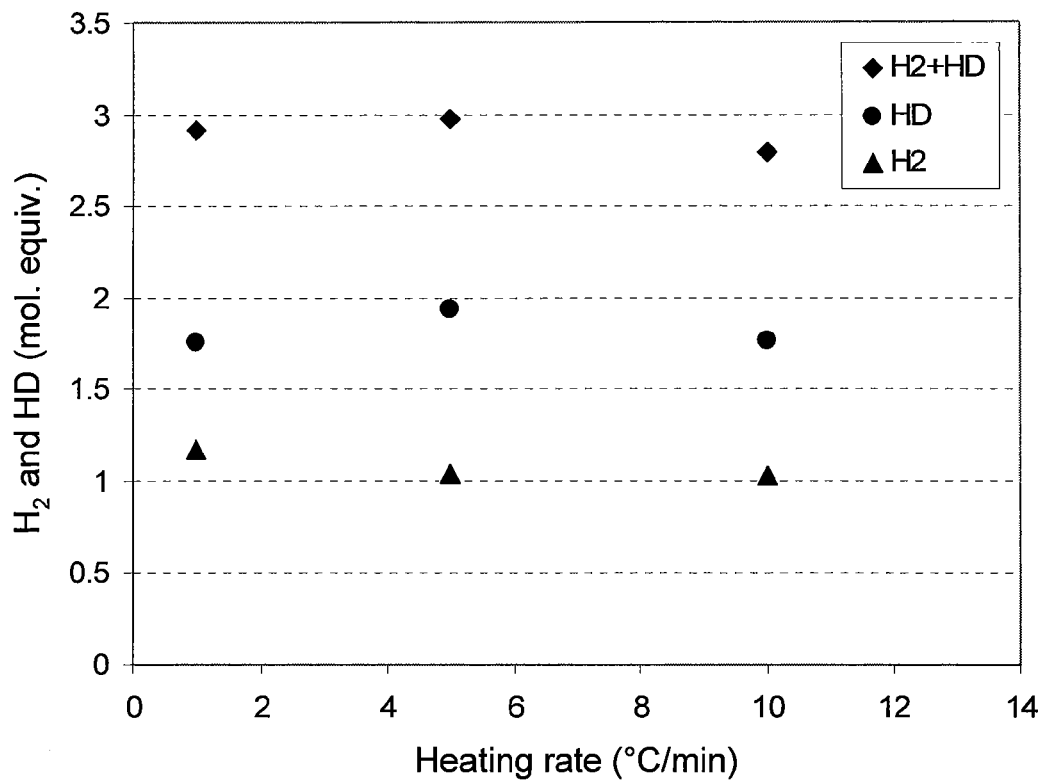
FIG. 13 is a graph depicting the influence of heating rate on the amounts of $H_2$ and HD evolved from $AB/D_2O$ mixtures at maximum temperature 135° C., initial pressure 14.6 atm and plateau duration of 1 hr.

FIGS. 12 and 13 show the influences of pressure and heating rate on the amounts of produced HD and $H_2$ at temperatures 135 and 170° C. It is shown that there is no significant effect of pressure or heating rate on either amount over the tested ranges of initial pressures and heating rates (11.2-18 atm and 1-10° C./min, respectively). Also, the same feature is observed as in FIG. 11: the sum of HD+$H_2$ remains constant.

Figure 14:
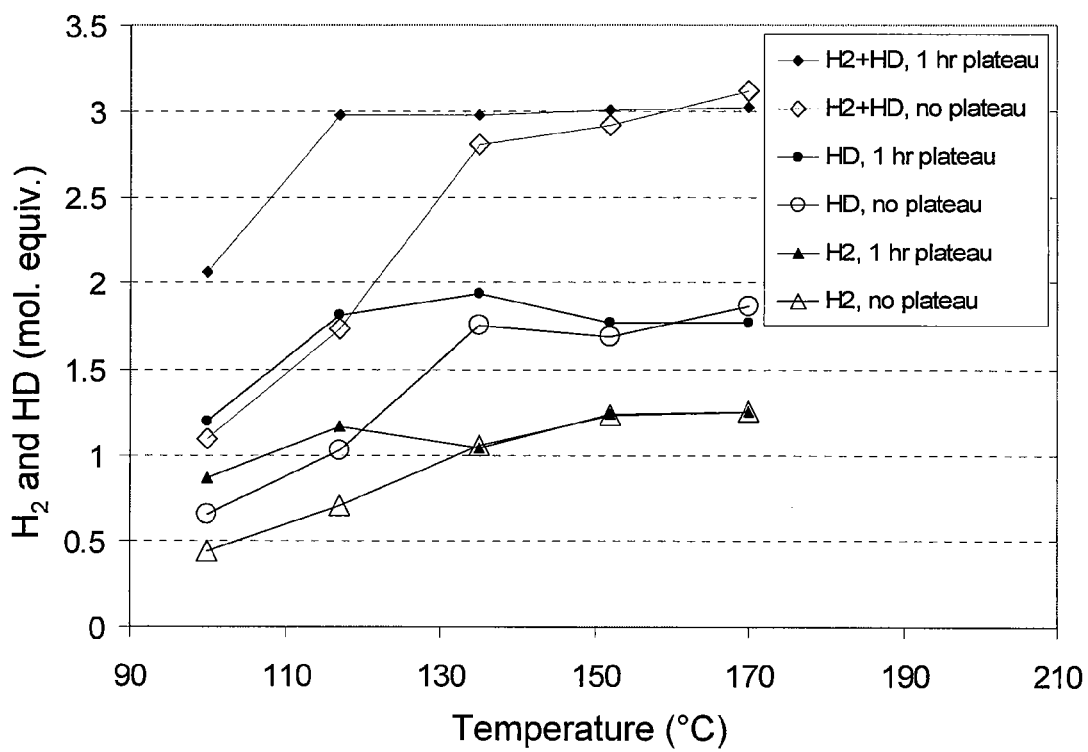
FIG. 14 is a graph depicting the influence of plateau duration on the amounts of $H_2$ and HD evolved from $AB/D_2O$ mixtures at initial pressure 14.6 atm, heating rate 5° C./min, and maximum temperatures 100-170° C.

FIG. 14 shows the influence of plateau duration on the amounts of HD and $H_2$ at initial pressure 14.6 atm, heating rate 5° C./min and different maximum temperatures. It is seen that the plateau is included for complete reaction at temperatures less than 135° C. but there is essentially no effect of plateau duration on either amount over the temperature range 135-170° C.

Figure 15:
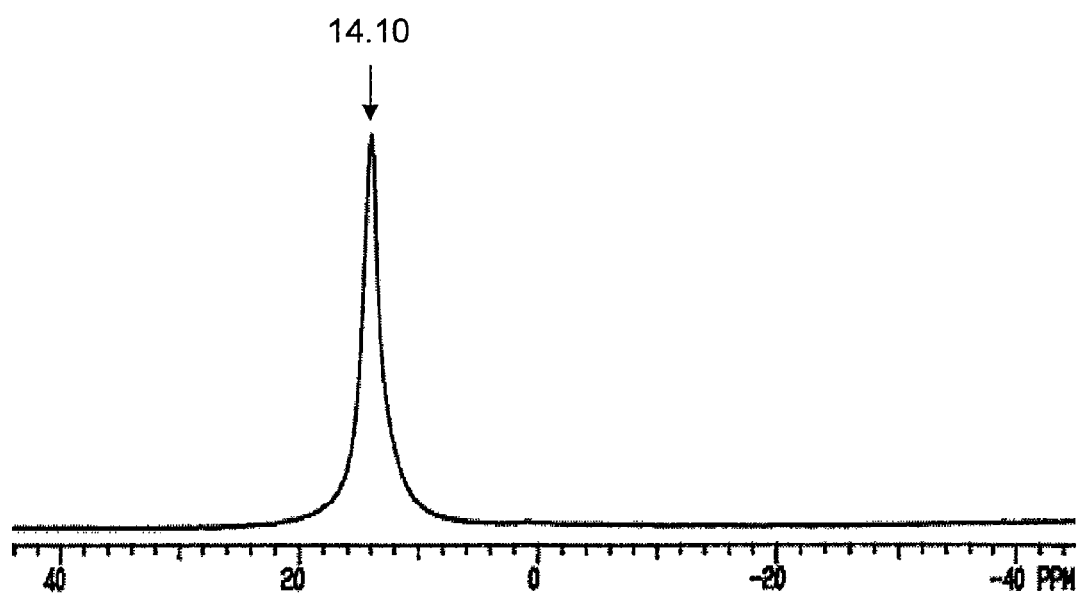
FIG. 15 is a graph depicting the $^{11}$B NMR spectrum of condensed products formed during reaction of AB with $D_2O$ in Ar atmosphere, initial pressure of 14.6 atm, and maximum temperature 135° C.

FIG. 15 depicts a $^{11}$B NMR spectrum of the obtained condensed products. There is no peak at −23.8 ppm corresponding to AB, which indicates that the reaction was complete. The peak at 14.1 ppm shows the formation of boric acid, $B(OH)_3$, in good agreement with the NMR results for catalyzed AB hydrolysis.

The presented results indicate that heating AB/$D_2$O solution to temperatures 117-170° C. releases 3 equiv. ($H_2$+HD), where the $H_2$/HD mole ratio varies in the range from 1:2 to 1.25:1.75.

Note that total hydrogen originating from AB is expressed as $H_2$+0.5HD, where $H_2$ varies from 1 to 1.25 and HD from 2 to 1.75 (see FIG. 11). Thus, independent of the specific reaction pathway, in the produced 3 equiv. of hydrogen, 2-2.1 equiv. come from AB. For comparison, catalytic hydrolysis of AB also produces 3 equiv. hydrogen but only 1.5 equiv. arise from AB. Similarly, dry thermolysis of AB at temperatures less than 135° C. yields 1.1±0.1 equiv. hydrogen, while ionic liquids based methods provide up to 1.6 equiv. Thus, the process investigated herein releases more hydrogen from AB at temperatures less than 135° C.

While the present invention has been described in terms of preferred embodiments, it will be understood, of course, that the invention is not limited thereto since modifications may be made to those skilled in the art, particularly in light of the foregoing teachings.

The invention claimed is:

1. A method of releasing hydrogen from ammonia borane, the method comprising:
    heating a composition consisting essentially of an aqueous ammonia borane solution, wherein the aqueous ammonia borane solution includes at least about 43 weight percent ammonia borane in water.

2. The method of claim 1, wherein the aqueous ammonia borane solution includes between about 43 weight percent to about 77 weight percent ammonia borane in water.

3. The method of claim 1, wherein the aqueous ammonia borane solution is heated to at least 80° C., wherein hydrogen release takes place.

* * * * *